Aug. 8, 1933.   H. L. SMITH   1,921,140
DYNAMO ELECTRIC MACHINE ROTOR AND A METHOD OF COOLING THE SAME
Filed Dec. 14, 1929

Inventor:
Harold L. Smith,
By Edwin B. H. Tower Jr.
Atty.

Patented Aug. 8, 1933

1,921,140

UNITED STATES PATENT OFFICE

1,921,140

DYNAMO-ELECTRIC MACHINE ROTOR AND A METHOD OF COOLING THE SAME

Harold L. Smith, Milwaukee, Wis., assignor to The Louis Allis Company, Milwaukee, Wis., a Corporation of Wisconsin Application December 14, 1929. Serial No. 414,065

8 Claims. (Cl. 171—252)

This invention relates to a dynamo electric machine rotor and a method of cooling the same.

The heat generated in a rotor must be dissipated in order to maintain the efficiency of the machine and this is often accomplished by providing vents in the rotor and forcing air therethrough.

However, the vents greatly reduce the heat storage capacity of the rotor which is of prime importance under certain conditions.

An object of the invention is to dissipate heat from a rotor without impairing the heat storage capacity thereof.

Another object is to increase the heat storage capacity of a rotor.

Another object is to conduct the heat outwardly from a rotor and dissipate the same.

Another object is to provide means to conduct the heat outwardly from a rotor and to agitate the surrounding air.

Another object is to provide a method of cooling the rotor of a conventional dynamo electric machine.

Another object is to provide a rotor which is capable of dissipating large quantities of heat and which may be employed in a conventional dynamo electric machine.

Other objects and advantages will appear hereinafter.

According to the invention as ordinarily practiced, heat conductors are inserted in the rotor core and extend beyond the ends thereof to conduct heat outwardly and radiate the same.

The ends of the heat conductors may also serve as fans to agitate the surrounding air and thus assist in the dissipation of heat.

The heat conductors have a higher heat storage capacity per unit of mass than the rotor core so that the heat storage capacity of the rotor is increased.

A rotor embodying the invention is shown in the accompanying drawing in which the views are as follows.

Figure 1:
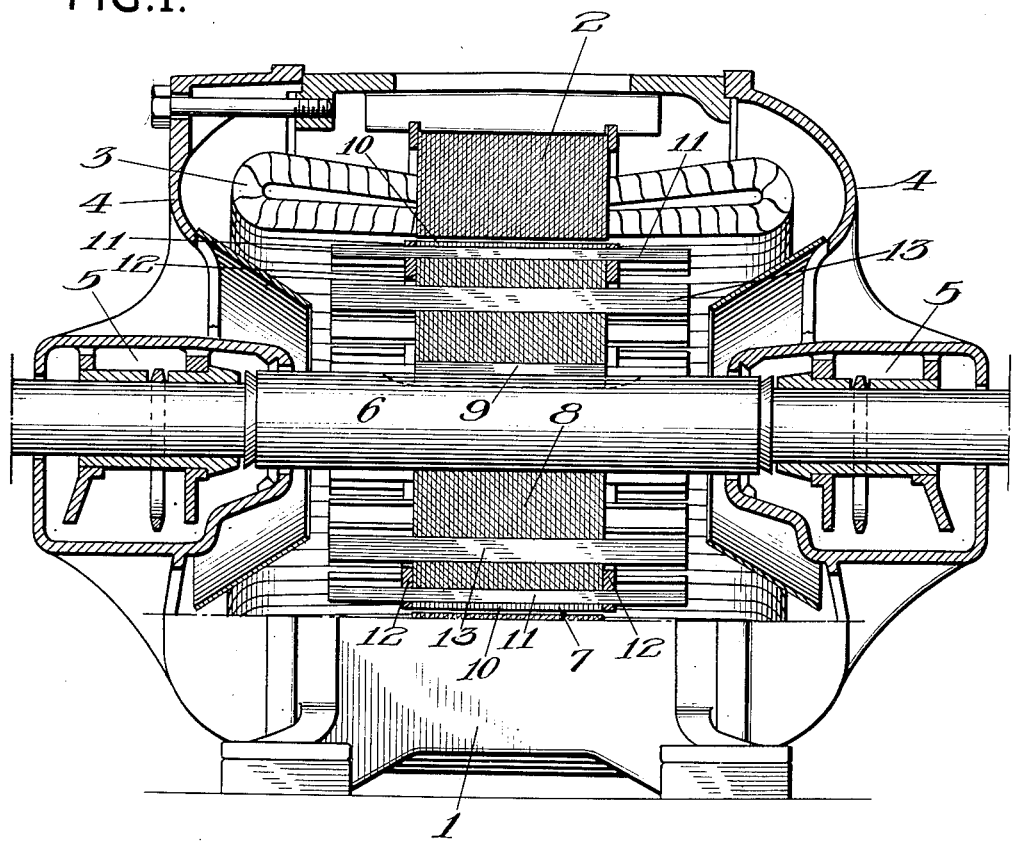
Fig. 1 is a central longitudinal section, partly in elevation, showing the rotor arranged in an induction motor.
Figure 2:
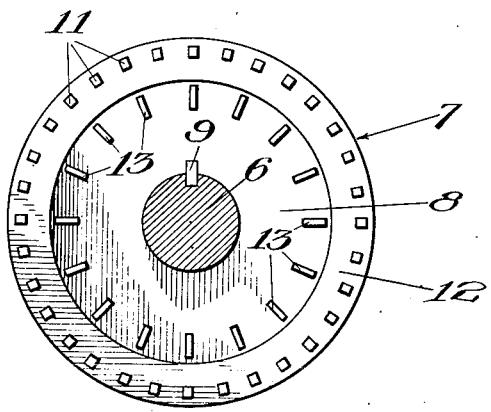
Fig. 2 is an end view of the rotor.

The rotor shown in Fig. 1 comprises, in general, a stator 1 having the usual laminated core 2 and windings 3, an end plate 4 arranged upon each end of the stator 1 and provided with a bearing 5, a rotor shaft 6 journaled in the bearings 5, and a rotor 7 having a laminated core 8 arranged upon the shaft 6 and attached thereto, as by means of a key 9.

The rotor core 8 has slots 10 formed in the periphery thereof to receive the rotor winding conductors 11 which are electrically connected to each other by conducting rings 12 arranged upon the ends of the core 8.

The ends of the conductors 11 extend beyond the rings 12 to radiate a part of the heat generated in the rotor when the machine is in operation and to agitate the surrounding air.

When the machine is operating under certain conditions, such as starting under a heavy load or carrying sudden and excessive overloads, heat is generated faster than it can be dissipated and must be stored temporarily in the rotor.

If the rotor core is provided with vents, the heat storage capacity thereof may be insufficient to prevent the rotor from attaining a dangerous temperature.

In order to avoid overheating under such conditions, heat conductors 13 are fixed in the core 8 in intimate thermal contact therewith and extend beyond the ends thereof to conduct heat outwardly and radiate the same.

The heat conductors 13 are formed of a material, such as copper, which has high thermal conductivity and a larger heat storage capacity per unit of mass that that of the core 8 so that the heat storage capacity of the rotor is increased by inserting the conductors 13 therein.

The heat conductors 13 are preferably flat bars so that the ends thereof may serve as fans to agitate the air in the motor and thus accelerate the dissipation of heat.

Rotors having vents for the passage of air may also be provided with heat conductors 13 to compensate in part for the loss in heat storage capacity, caused by removing the material of the core to form the vents, and to assist in dissipating the heat generated in the rotor.

The invention herein set forth is not limited to the induction motor shown but is adaptable to any dynamo electric machine and susceptible of various modifications without departing from the scope of the invention as hereafter claimed.

The invention is hereby claimed as follows:

1. A dynamo electric machine rotor comprising a laminated core, a winding carried by said core, and metallic heat conductors arranged in said core independent of said winding to conduct heat outwardly therefrom.

2. A dynamo electric machine rotor comprising a laminated core, a winding carried by said core, and heat conducting bars embedded in said core independent of said winding and extending beyond the ends thereof.

3. A dynamo electric machine rotor comprising a laminated core, a winding carried by said core, and flat bars of heat conducting material arranged in said core independent of said winding and extending beyond the ends thereof to provide fans for agitating the air surrounding said core.

4. A dynamo electric machine rotor comprising a laminated core, a winding carried by said core, and copper bars arranged in said core independent of said winding and extending beyond the ends thereof to provide fans for agitating the air surrounding said core.

5. A dynamo electric machine rotor comprising a laminated core having a winding, and separate bars having large heat storage capacity per unit of mass embeded in said core independent of the winding thereof.

6. A dynamo electric machine rotor comprising a laminated core having a winding, and flat separate bars having large heat storage capacity per unit of mass and high thermal conductivity embedded in said core independent of the winding thereof and extending beyond the ends of said core to provide fans for agitating the air surrounding said core.

7. A dynamo electric machine rotor, comprising a laminated core having a winding, a shaft to carry said core, and metallic bars embedded in said core between its winding and said shaft to absorb heat from within said core and extended beyond the ends of said core to dissipate said heat by radiation.

8. A dynamo electric machine rotor, comprising a laminated core having a winding, a shaft to carry said core, and bars of non-ferrous metal embedded in said core between its winding and said shaft to absorb heat from within said core and extended beyond the ends of said core to dissipate said heat by radiation.

HAROLD L. SMITH.